United States Patent
Hsu

(10) Patent No.: US 10,795,116 B2
(45) Date of Patent: Oct. 6, 2020

(54) OPTICAL MEMBER DRIVING MODULE

(71) Applicant: TDK TAIWAN CORP., Taoyuan (TW)

(72) Inventor: Nai-Wen Hsu, Taoyuan (TW)

(73) Assignee: TDK Taiwan Corp., Yangmei, Taoyuan (TW)

( * ) Notice: Subject to any disclaimer, the term of this patent is extended or adjusted under 35 U.S.C. 154(b) by 0 days.

(21) Appl. No.: 16/502,719

(22) Filed: Jul. 3, 2019

(65) Prior Publication Data
US 2019/0324228 A1    Oct. 24, 2019

Related U.S. Application Data

(63) Continuation of application No. 15/402,528, filed on Jan. 10, 2017, now Pat. No. 10,386,597.

(30) Foreign Application Priority Data

Jul. 29, 2016   (TW) .............................. 105124030 A

(51) Int. Cl.
*G02B 7/10* (2006.01)
*G02B 7/08* (2006.01)
(Continued)

(52) U.S. Cl.
CPC .............. *G02B 7/102* (2013.01); *G02B 7/08* (2013.01); *G03B 3/10* (2013.01); *G03B 5/00* (2013.01);
(Continued)

(58) Field of Classification Search
CPC ... G02B 7/04; G02B 7/09; G02B 7/10; G02B 7/102; G03B 5/00; G03B 13/34; G03B 13/36; G03B 3/10; G03B 2205/0069
See application file for complete search history.

(56) References Cited

U.S. PATENT DOCUMENTS 10,444,599 B2 * 10/2019 Park ..................... G03B 9/02
2015/0155768 A1    6/2015 Hsu et al.
(Continued)

FOREIGN PATENT DOCUMENTS

| CN | 204422843 U | 6/2015 |
| CN | 104935792 A | 9/2015 |

(Continued)

OTHER PUBLICATIONS

Office Action dated Sep. 29, 2019 in CN Application No. 201611262050.2.

(Continued)

*Primary Examiner* — Cara E Rakowski
(74) *Attorney, Agent, or Firm* — Muncy, Geissler, Olds & Lowe, P.C.

(57) ABSTRACT

A moving mechanism for holding a lens is provided, including a carrier having an accommodating space, a coil, a sensing object, a base, at least one magnetic member, and a position detector, wherein the lens is disposed in the accommodating space. The coil and the sensing object are disposed on the carrier, and the coil surrounds the accommodating space. At least a portion of the coil is disposed between the sensing object and the accommodating space. The magnetic member and the position detector are disposed on the base, and the position detector is adjacent to the sensing object. When a current flows through the coil, the carrier moves relative to the base.

18 Claims, 6 Drawing Sheets

(51) Int. Cl.
*G03B 3/10* (2006.01)
*G03B 5/00* (2006.01)
*G03B 13/36* (2006.01)

(52) U.S. Cl.
CPC ...... *G03B 13/36* (2013.01); *G03B 2205/0069* (2013.01)

(56) References Cited

U.S. PATENT DOCUMENTS

| | | |
|---|---|---|
| 2015/0261067 A1 | 9/2015 | Jung et al. |
| 2015/0362696 A1* | 12/2015 | Han .................... G02B 27/646 |
| | | 359/824 |
| 2016/0077305 A1* | 3/2016 | Park ........................ G02B 7/09 |
| | | 359/824 |
| 2016/0139425 A1 | 5/2016 | Park et al. |
| 2017/0123180 A1* | 5/2017 | Osaka .................... G02B 7/09 |

FOREIGN PATENT DOCUMENTS

| | | |
|---|---|---|
| EP | 2955557 A1 | 12/2015 |
| TW | 201600898 A | 1/2016 |

OTHER PUBLICATIONS

Office Action dated Apr. 25, 2017 in corresponding TW Application No. 105124030, 5 pages.
Office Action dated Nov. 30, 2017 in corresponding TW Application No. 105124030 (5 pages).

* cited by examiner

OPTICAL MEMBER DRIVING MODULE

CROSS REFERENCE TO RELATED APPLICATIONS

This application is a Continuation of application Ser. No. 15/402,528, filed on Jan. 10, 2017, which claims the benefit of Taiwan Patent Application No. 105124030, filed on Jul. 29, 2016.

BACKGROUND OF THE INVENTION

Field of the Invention

The application relates in general to a moving mechanism, and in particular, to a moving mechanism for holding a lens.

Description of the Related Art

As technology has advanced, a lot of electronic devices (for example, cameras and smartphones) have the functionality of taking photographs or recording video. These electronic devices have become more commonplace, and have been developed to be more convenient, exquisite, and thin. More and more choices are provided for users to choose from.

However, in some electronic devices, the lens module has complex components so as to achieve autofocus. These components have significant height, and as such it is hard to make the electronic device thin.

BRIEF SUMMARY OF INVENTION

To address the deficiencies of conventional products, an embodiment of the invention provides a charging system, including a carrier having an accommodating space, a coil, a sensing object, a base, at least one magnetic member, and a position detector, wherein the lens is disposed in the accommodating space. The coil and the sensing object are disposed on the carrier, and the coil surrounds the accommodating space. At least a portion of the coil is disposed between the sensing object and the accommodating space. The magnetic member and the position detector are disposed on the base, and the position detector is adjacent to the sensing object. When a current flows through the coil, the carrier moves relative to the base.

In some embodiments, the sensing object is disposed between the position detector and the coil.

In some embodiments, the sensing object has a first surface and a second surface, wherein the first surface faces the coil, and the second surface is adjacent to the first surface and faces the position detector.

In some embodiments, the carrier further comprises a position-restricting member having at least one opening, wherein the sensing object is disposed in the position-restricting member, and the opening is formed between the sensing object and the position detector.

In some embodiments, the position-restricting member further comprises a first restricting portion and a second restricting portion, and the first restricting portion is separated from the second restricting portion.

In some embodiments, the first restricting portion has a U-shaped structure and the second restricting portion has another U-shaped structure, wherein the first restricting portion and the second restricting portion are symmetrical.

In some embodiments, the carrier further comprises a concave structure, and the coil is disposed in the concave structure.

In some embodiments, the distance between the first restricting portion and the second restricting portion exceeds or is the same as the height of the concave structure.

In some embodiments, the moving mechanism further comprises a first elastic member connecting the base and the carrier.

In some embodiments, the position detector comprises a hall sensor, a magnetoresistance effect sensor, a giant magnetoresistance effect sensor, a tunneling magnetoresistance effect sensor, an optical encoder, or an infrared sensor.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the moving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
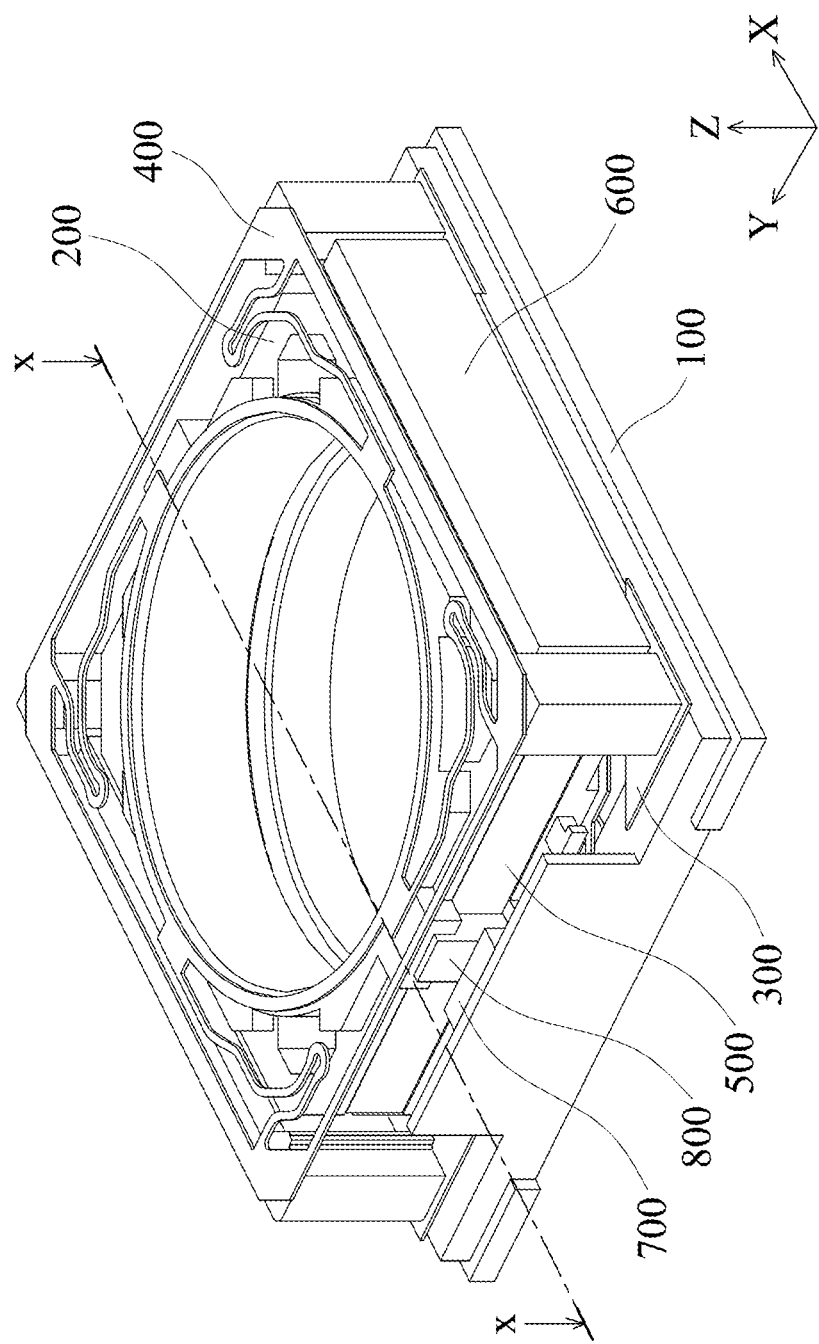
FIG. 1 is a schematic diagram of a moving mechanism according to an embodiment of the invention.
Figure 2:
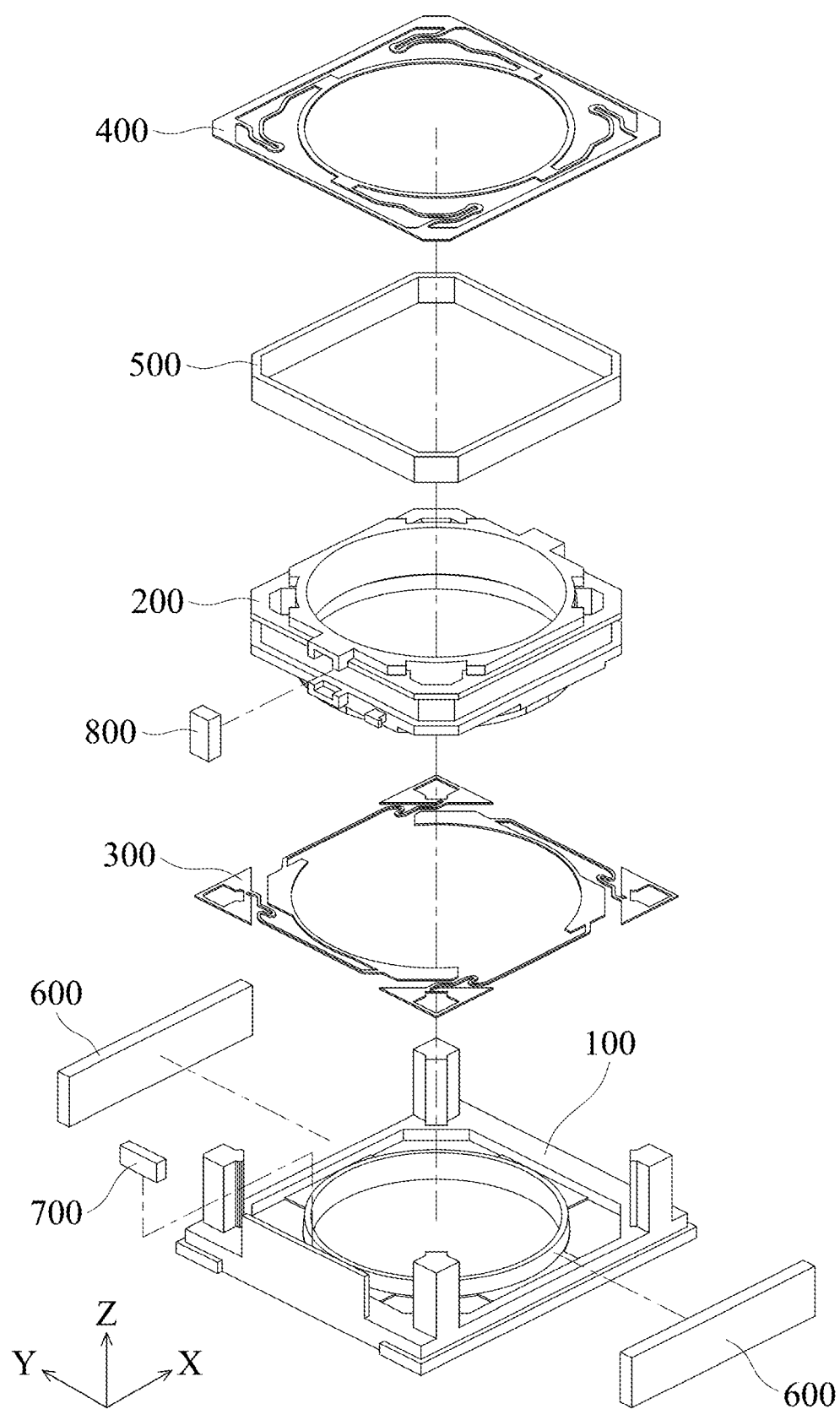
FIG. 2 is an exploded-view diagram of a moving mechanism according to an embodiment of the invention.

FIG. 1 is a schematic diagram of a moving mechanism according to an embodiment of the invention, and FIG. 2 is an exploded-view diagram of the aforementioned moving mechanism. The moving mechanism can be disposed in an electronic device (such as a camera) having the function of capturing photographs or making recordings to hold a lens and move the lens relative to an image sensor in the electronic device, so as to adjust the focal length. As shown in FIGS. 1 and 2, the moving mechanism primarily comprises a base 100, a carrier 200, a first elastic member 300, a second elastic member 400, a coil 500, at least one magnetic member 600, a position detector 700, and a sensing object 800, wherein the magnetic member 600 and the position detector 700 are affixed to the base 100.

Figure 3:
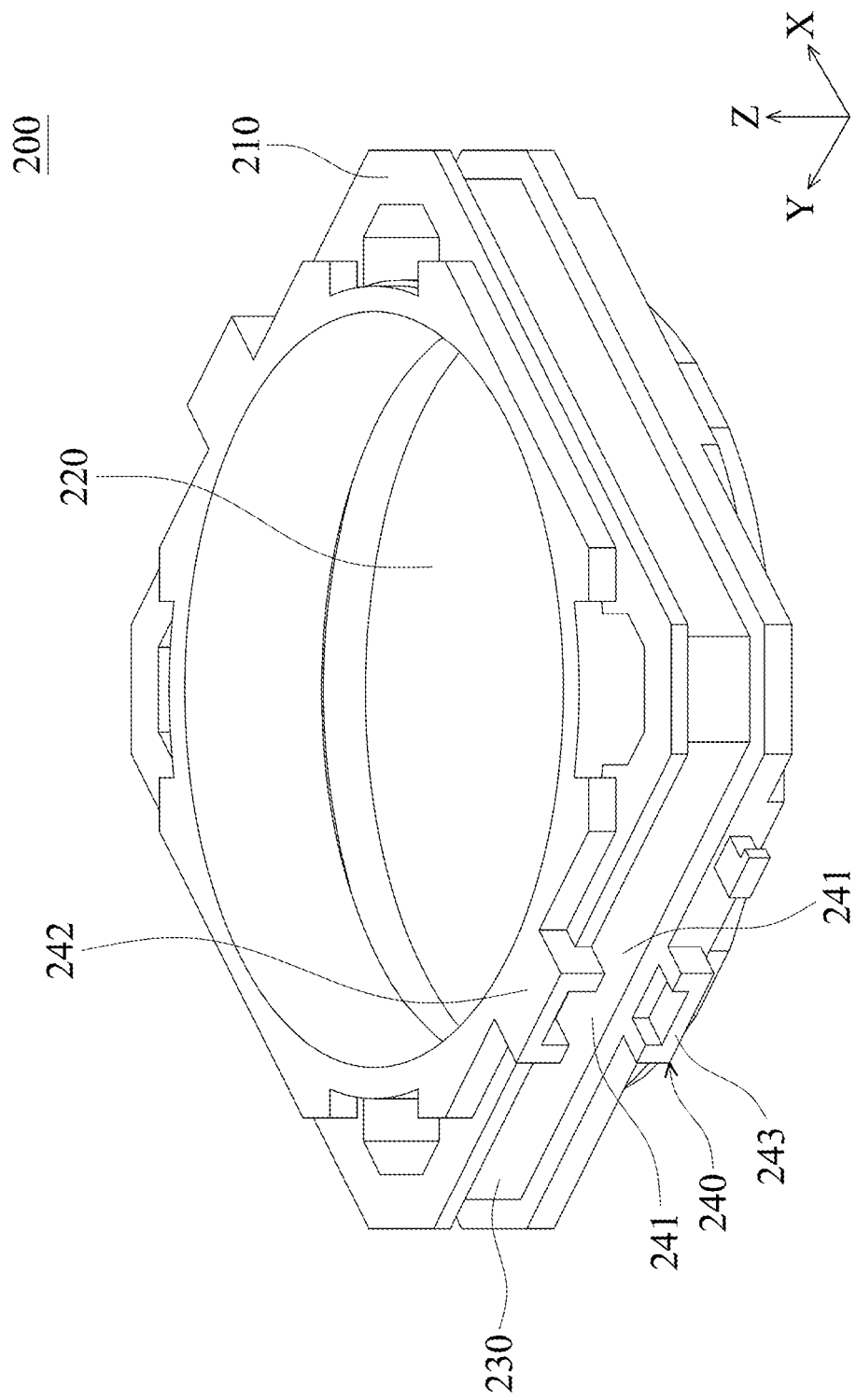
FIG. 3 is a schematic diagram of a carrier according to an embodiment of the invention.

Referring to FIG. 3, an accommodating space 220, a concave structure 230, and a position-restricting member 240 are formed on a frame 210 of the carrier 200. The accommodating space 220 is formed at the center of the carrier 200 and surrounded by the concave structure 230. The position-restricting member 240 is formed on a side of the frame 210 and is connected to the concave structure 230. The distance between the position-restricting member 240 and the accommodating space 220 is greater than the distance between the concave structure 230 and the accommodating space 220. The lens (not shown) is affixed to the carrier 200 and accommodated in the accommodating space 220. The coil 500 and the sensing object 800 are respectively disposed in the concave structure 230 and the position-restricting member 240 (as shown in FIGS. 1-3).

As shown in FIG. 3, in this embodiment, each of the walls of the position-restricting member 240 has an opening 241, so that a first restricting portion 242 and a second restricting portion 243 separated from the first restricting portion 242 can be formed. The first restricting portion 242 has a U-shaped structure, and the second restricting portion 243 has another U-shape structure, wherein the U-shaped structure of the first restricting portion 242 and the U-shaped structure of the second restricting portion 243 are symmetrical. The width of the recess of the U-shaped structure is substantially the same as that of the sensing object 800. Therefore, the sensing object 800 can be restricted in the position-restricting member 240 exactly, and disposed between the first restricting potion 242 and the second restricting portion 243. Furthermore, the distance between the first restricting portion 242 and the second restricting portion 243 exceeds or is the same as the height of the concave structure 230. Thus, the coil 500 can be put in the concave structure 230 through the position-restricting member 240, and can be also removed or replaced from the concave structure 230 through the position-restricting member 240.

Figure 4:
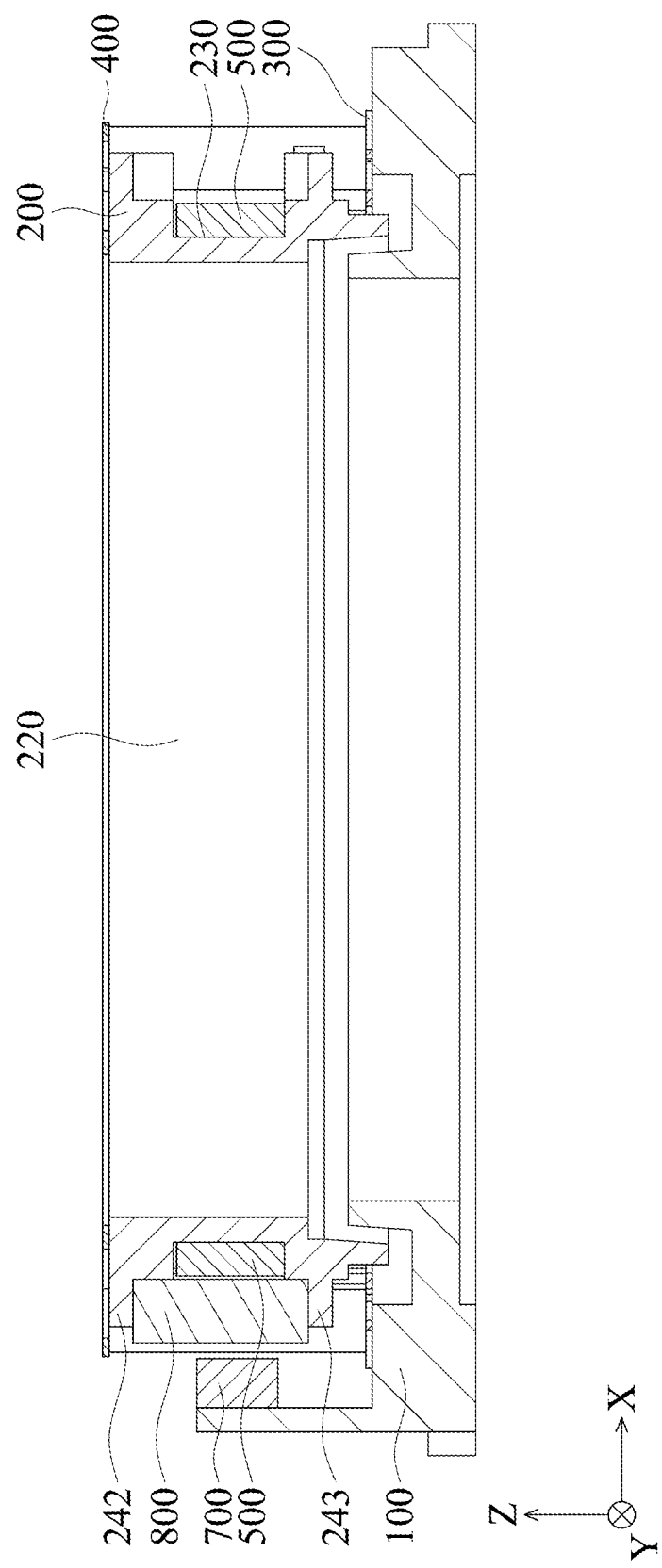
FIG. 4 is a cross-sectional view along the line x-x in FIG. 1.

FIG. 4 is a cross-sectional view along the line x-x in FIG. 1. Referring to FIGS. 1, 3, and 4, when the moving mechanism is assembled, the coil 500 is disposed in the concave structure 230 of the carrier 200 and surrounds the accommodating space 220. The sensing object 800 is disposed in the position-restricting member 240 and exposed from the opening 241. The position detector 700 is adjacent to the sensing object 800. The left portion of the coil 500 is disposed between the sensing object 800 and the accommodating space 220, and the sensing object 800 is disposed between the position detector 700 and the coil 500. The first elastic member 300 connects the base 100 to the carrier 200, and the second elastic member 400 also connects the base 100 to the carrier 200. The carrier 200 is disposed between the first elastic member 300 and the second elastic member 400. Thus, the carrier 200 can be hung on the base 100 by the first elastic member 300 and the second elastic member 400. Moreover, the aforementioned electronic device usually comprises an image sensor (not shown) corresponding to the lens on the carrier 200 and disposed below the base 100. The image sensor is affixed relative to the base 100. The light can pass through the lens and form an image on the image sensor.

When a current flows through the coil 500, the electromagnetic induction is generated between the coil 500 and the magnetic member 600, and the carrier 200 moves along the Z-axis direction or the −Z-axis direction relative to the base 100. The position detector 700 can detect the position of the sensing object 800, and the position of the carrier 200 relative to the base 100 can be obtained. The distance between the lens and the image sensor can be adjusted. It should be noted that since the position detector 700 is adjacent to the sensing object 800, and there is no other component disposed therebetween, the heights of the position detector 700 and the sensing object 800 can be reduced. The whole height of the moving mechanism can be reduced accordingly, and the electronic device can be thin and slim.

In the conventional electronic device, the sensing object is surrounded by the coil, such that the position detector and the sensing object are blocked by the coil. Furthermore, a gap has to be formed between the coil and the position detector to avoid damage caused by friction when the lens moves. Therefore, in the conventional electronic device, the distance between the sensing object and the position detector at least comprises the aforementioned gap and the thickness of the coil. The distance between the sensing object and the position detector in the conventional electronic device is greater than that in the present application. Since a great distance is formed between the sensing object and the position detector, it is hard for the position detector to detect the position of the sensing object, for example, by detecting a magnetic field variation. A sensing object having a great height (the length along the Z-axis) should be used, and the thickness of the electronic device is increased.

The position detector 700 can be a Hall sensor, a magnetoresistance effect sensor (MR sensor), a giant magnetoresistance effect sensor (GMR sensor), a tunneling magnetoresistance effect sensor (TMR sensor), an optical encoder, or an infrared sensor. When the hall sensor, the magnetoresistance effect sensor, the giant magnetoresistance effect sensor, or the tunneling magnetoresistance effect sensor is used as the position detector 700, the sensing object 800 can be a magnet. When the optical encoder or the infrared sensor is used as the position detector 700, the sensing object 800 can be a reflective sheet.

As shown in FIGS. 1 and 2, in this embodiment, the moving mechanism comprises two magnetic members 600 respectively disposed on the opposite sides of the base 100. The length of the magnetic member 600 is substantially the same as that of the carrier 200. Therefore, when the current flows through the coil 500, sufficient force can be generated at opposite sides of the carrier 200, and the carrier 200 can move relative to the base 100. However, the number of magnetic members 600 and the dimensions of the magnetic members 600 can be adjusted as required, and are not limited to the aforementioned embodiment. The distance between the position detector 700 and the sensing object 800 can be adjusted to the closest distance according to the appearances of the base 100 and the carrier 200, and the position detector 700 and the sensing object 800 having a small height can be used. The distance of the position-restricting member 240 protruding from the concave structure 230 is less than or the same as the thickness of the sensing object 800, so that the width of the moving mechanism along the X-axis can be minimized.

Figure 5:
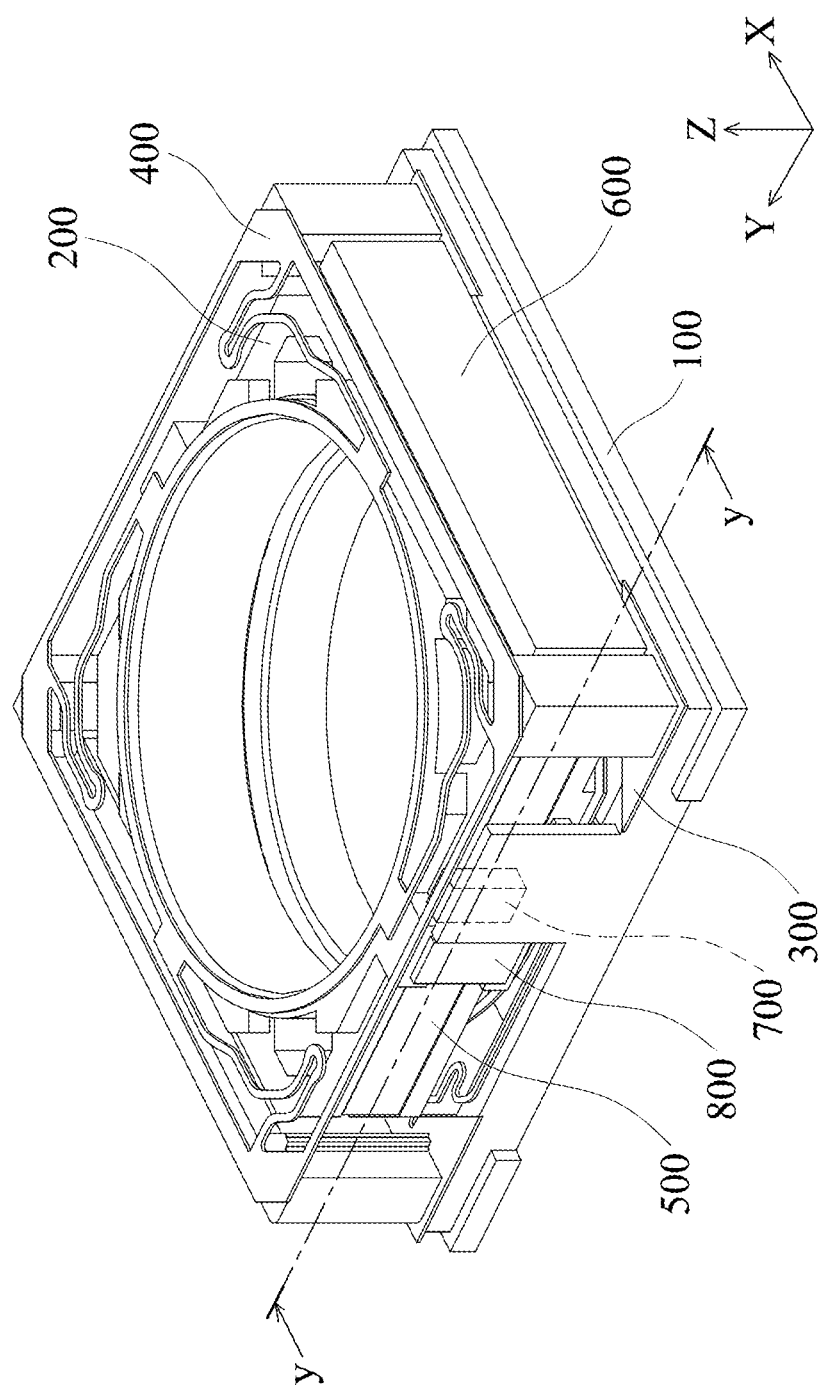
FIG. 5 is a schematic diagram of a moving mechanism according to another embodiment of the invention.
Figure 6:
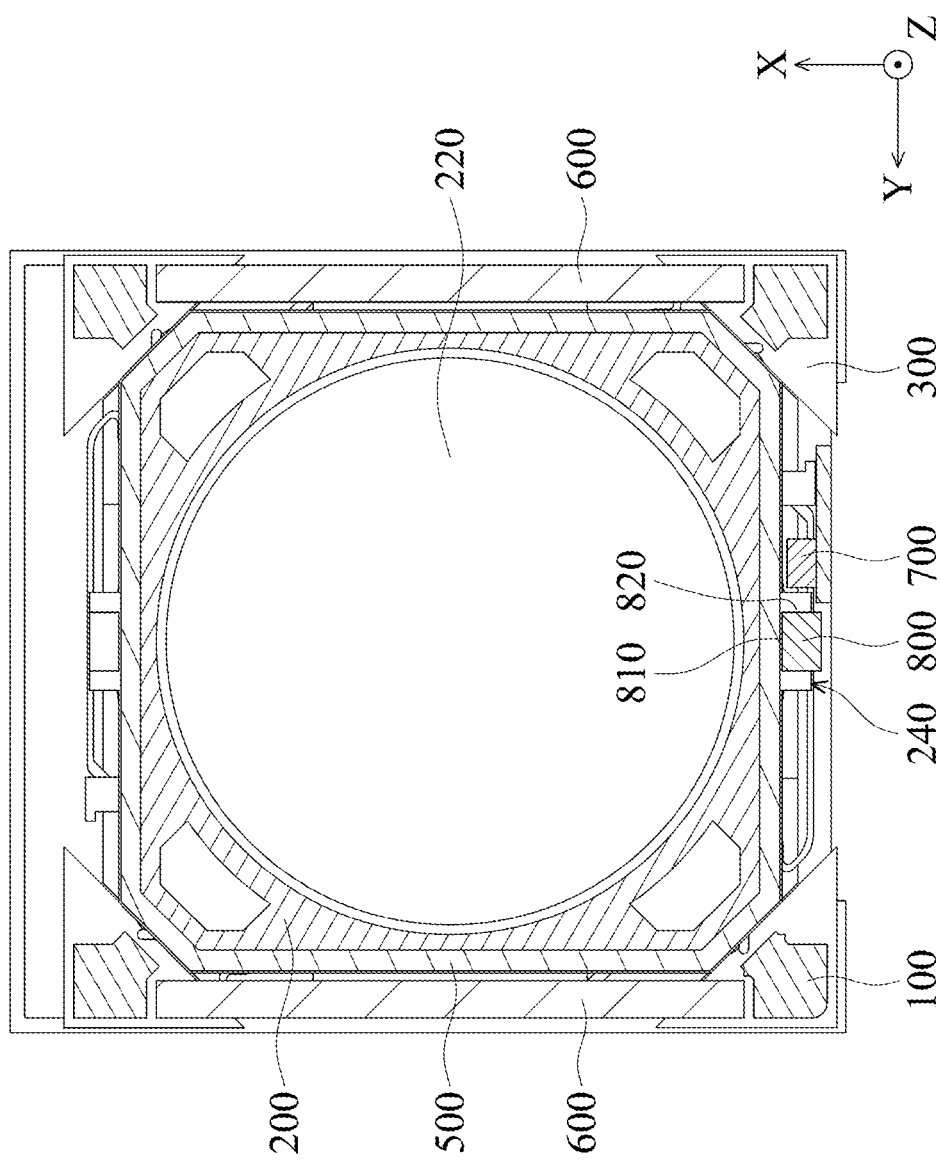
FIG. 6 is a cross-sectional view along the line y-y in FIG. 5.

Referring to FIGS. 5 and 6, in another embodiment, the moving mechanism comprises a base 100, a carrier 200, a first elastic member 300, a second elastic member 400, a coil 500, at least one magnetic member 600, a position detector 700, and a sensing object 800, wherein the structure of the base 100, the carrier 200, the first elastic member 300, the second elastic member 400, the coil 500, the magnetic member 600, and the sensing object 800, and the relation therebetween are the same as the members in the embodiment of FIG. 1. The difference between the embodiment of FIG. 1 and this embodiment is the position of the position detector 700.

As shown in FIGS. 5 and 6, in this embodiment, the sensing object 800 has a first surface 810 and a second surface 820. The first surface 810 faces the coil 500 and the second surface 820 faces the position detector 700. The first surface 810 is adjacent to the second surface 820. Therefore, the outer surface of the position detector 700 does not protrude from the outer surface of the sensing object 800, and the width of the moving mechanism can be reduced.

In summary, a moving mechanism is provided. Since the coil is disposed between the accommodating space and the sensing object, the sensing object is close to the position detector. The height and dimensions of the position detector can be reduced, and the height of the moving mechanism can be reduced.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical member driving module, comprising:
a base;
a carrier, holding an optical member having an optical axis;
a driving assembly, driving the carrier to move relative to the base; and
a position detector, disposed on the base and sensing the relative movement between the carrier and the base, wherein the base comprises a wall extending along the optical axis, and the position detector is disposed on the wall, wherein the driving assembly comprises a magnetic member having a longitudinal axis, and the carrier and the position detector are overlapped as seen from a direction perpendicular to the optical axis and the longitudinal axis.

2. The optical member driving module as claimed in claim 1, wherein the wall does not protrude from the carrier along the optical axis.

3. The optical member driving module as claimed in claim 1, wherein the optical member driving module further comprises a sensing object, and an opening is formed on a lateral wall of the carrier, wherein the lateral wall is parallel to the optical axis, and the sensing object is disposed in the opening.

4. The optical member driving module as claimed in claim 3, wherein there is no member disposed between the sensing object and the position detector.

5. The optical member driving module as claimed in claim 3, wherein the driving assembly comprises a coil disposed on the carrier, and the shortest distance between the sensing object and the position detector is less than the shortest distance between the coil and the position detector as seen from the optical axis.

6. The optical member driving module as claimed in claim 3, wherein the shortest distance between the carrier and the position detector is less than the shortest distance between the sensing object and the position detector.

7. The optical member driving module as claimed in claim 3, wherein the carrier comprises a first restricting portion and a second restricting portion, and the opening is formed between the first restricting portion and the second restricting portion.

8. The optical member driving module as claimed in claim 7, wherein the first restricting portion has a U-shaped structure, and the second restricting portion has another U-shaped structure.

9. The optical member driving module as claimed in claim 8, wherein the first restricting portion and the second restricting portion are symmetrical.

10. The optical member driving module as claimed in claim 7, wherein the first restricting portion is separated from the second restricting portion.

11. The optical member driving module as claimed in claim 7, wherein the sensing object protrudes from the first restricting portion and the second restricting portion.

12. The optical member driving module as claimed in claim 3, wherein the sensing member has a first surface and a second surface adjacent to the first surface, the first surface faces the carrier, and the second surface faces the position detector.

13. The optical member driving module as claimed in claim 12, wherein the first surface is not parallel to the second surface.

14. The optical member driving module as claimed in claim 1, wherein the driving assembly comprises two magnetic members, and the distance between the position detector and one of the magnetic members is different from the distance between the position detector and another one of the magnetic members.

15. The optical member driving module as claimed in claim 14, wherein the optical member driving module further comprises a sensing object disposed on the carrier, and the distance between the sensing object and one of the magnetic members is substantially the same as the distance between the sensing object and another one of the magnetic members.

16. The optical member driving module as claimed in claim 1, wherein optical member driving module further comprises a first elastic member and a second elastic member, and the carrier is disposed between the first elastic member and the second elastic member.

17. An optical member driving module, comprising:
a base;
a carrier, holding an optical member having an optical axis;

a driving assembly, driving the carrier to move relative to the base; and a position detector, disposed on the base and sensing the relative movement between the carrier and the base, wherein the base comprises a wall extending along the optical axis, and the position detector is disposed on the wall; and a sensing object, disposed on the carrier, wherein the driving assembly comprises a magnetic member having a longitudinal axis, and the sensing object and the wall are overlapped as seen from a direction perpendicular to the optical axis and the longitudinal axis.

18. An optical member driving module, comprising:

a base;

a carrier, holding an optical member having an optical axis;

a driving assembly, driving the carrier to move relative to the base; and a position detector, disposed on the base and sensing the relative movement between the carrier and the base, wherein the base comprises a wall extending along the optical axis, and the position detector is disposed on the wall, wherein the base has a first side and a second side opposite to the first side, and the distance between the first side and the center of the wall is different from the distance between the second side and the center of the wall.

* * * * *